United States Patent [19]

Ohkubo

[11] 4,371,062
[45] Feb. 1, 1983

[54] CLUTCH OPERATING DEVICE

[75] Inventor: Kiyokazu Ohkubo, Wako, Japan

[73] Assignee: Honda Giken Kogyo Kabushiki Kaisha, Tokyo, Japan

[21] Appl. No.: 177,802

[22] Filed: Aug. 13, 1980

[30] Foreign Application Priority Data

Aug. 18, 1979 [JP] Japan .................... 54-113633[U]

[51] Int. Cl.³ .................... B60K 41/22; F16D 19/00
[52] U.S. Cl. .................... 192/3.61; 74/474; 192/89 A; 192/93 R; 192/93 B
[58] Field of Search .................... 192/3.61, 3.62, 3.54, 192/93 B, 93 R, 110 R, 89 A; 74/474

[56] References Cited

U.S. PATENT DOCUMENTS

| | | | |
|---|---|---|---|
| 1,693,645 | 12/1928 | Fahrney | 192/3.61 |
| 2,077,553 | 4/1937 | Fishburn et al. | 192/3.62 X |
| 2,171,385 | 8/1939 | Zeidler | 192/110 R X |
| 2,439,611 | 4/1948 | Nabstedt | 192/89 A X |
| 2,617,505 | 11/1952 | Taige | 192/3.61 |
| 2,914,158 | 11/1959 | Zeidler et al. | 192/110 R X |

FOREIGN PATENT DOCUMENTS 1039865 9/1958 Fed. Rep. of Germany ........ 74/474

*Primary Examiner*—Rodney M. Bonck
*Attorney, Agent, or Firm*—Armstrong, Nikaido, Marmelstein & Kubovcik

[57] ABSTRACT

A clutch operating device in which an operating shaft is reciprocatingly rotated to operate a clutch operating member for setting and unsetting of a clutch. The clutch operating device has an operating shaft, and a cam mechanism disposed on the operating shaft. The cam mechanism is movable axially as the operating shaft rotates. A clutch release member controls setting and unsetting of the clutch, and a clutch lever connects operatively the cam mechanism to the clutch release member to actuate the clutch release member in response to axial forward movement of the cam mechanism. A return spring biases the cam mechanism backward through the clutch lever.

10 Claims, 3 Drawing Figures

CLUTCH OPERATING DEVICE

BACKGROUND OF THE INVENTION

The present invention relates to a clutch operating device in which an operating shaft is reciprocatively rotated to operate a clutch release member for engaging and disengaging the clutch and more particularly to an improvement in the device wherein an operating shaft includes a cam mechanism which is disposed on the operating shaft and is movable axially as the operating shaft rotates. The cam mechanism is operatively connected to the clutch release member through a clutch lever arranged therebetween so that the clutch release member is activated as the cam mechanism moves axially.

In a clutch operating device of the foregoing species, generally, adjustment is made so that a small clearance is formed between the clutch lever and the clutch release member in order to positively maintain a setting or engaged condition of the clutch when the operating shaft is not operated. Therefore prior art devices have the disadvantages that the clutch lever vibrates within the small clearance to generate noise and to produce a beating type of wear in a contact portion between the clutch lever and the sliding cam plate and clutch release member.

SUMMARY OF THE INVENTION

It is an object of the present invention to provide a clutch operating device which is simple and effective while overcoming those disadvantages noted above with respect to the prior art.

In accordance with the present invention, there is provided a clutch operating device which has an operating shaft, a cam mechanism disposed on the operating shaft and movable axially as the operating shaft rotates reciprocatively. A clutch release member controls engagement and disengagement of the clutch. A clutch lever connects operatively the cam mechanism to the clutch release member to actuate the clutch release member in response to axial forward movement of the cam mechanism. A return spring biases the cam mechanism backward through the clutch lever.

The above and other objects, features and advantages of the invention will become apparent from the following detailed description of the invention when taken in conjunction with the accompanying drawings, which illustrate a presently preferred embodiment of the invention.

DESCRIPTION OF THE PREFERRED EMBODIMENT

Figure 1:
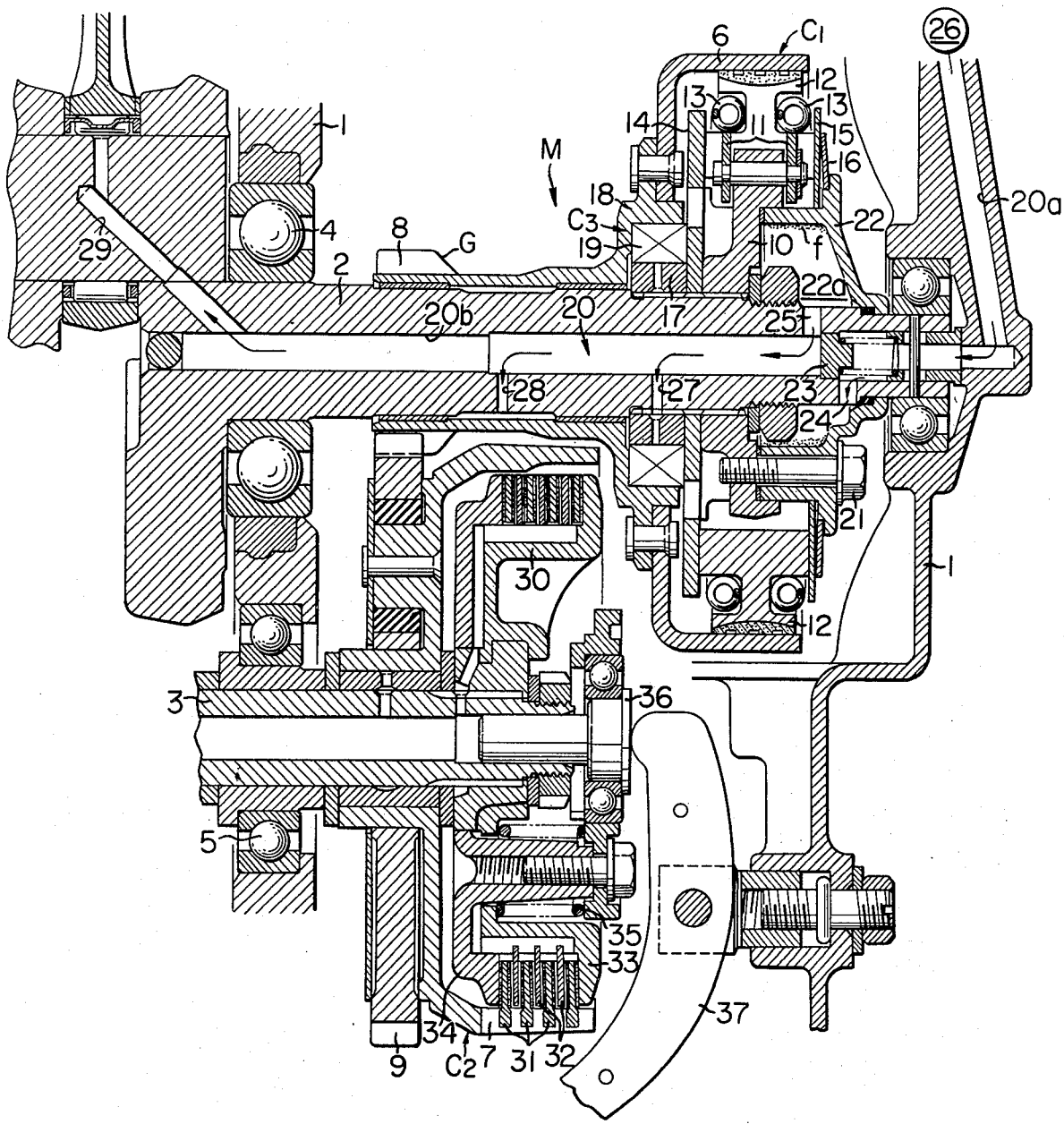
FIG. 1 is a cross sectional view of one embodiment of the device in accordance with the present invention.
Figure 2:
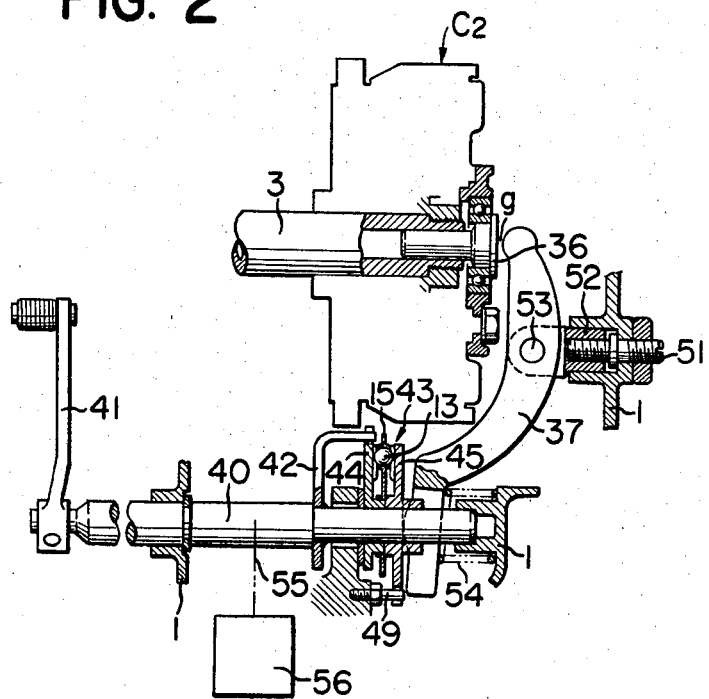
FIG. 2 is a longitudinal sectional side view showing a main portion thereof.
Figure 3:
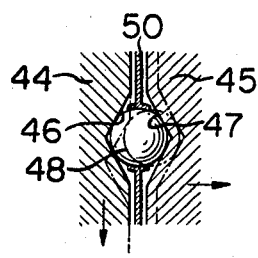
FIG. 3 is a partial cross sectional view, on an enlarged scale, of a cam mechanism.

Referring now to FIGS. 1 and 2, a crank casing 1 of the engine has a crank shaft 2 and a speed change input shaft 3 supported thereon parallel to the shaft 2 through bearings 4 and 5. A transmission device M is interposed between both the shafts 2 and 3.

The transmission device M has a starting clutch C1 provided on one end of the crank shaft 2, a speed change clutch C2 which is provided on one end of the speed change input shaft 3 and operated by a clutch operating mechanism of the invention as described later, and a reduction gear train G composed of small and large diameter gears 8 and 9, respectively, connected to a clutch drum 6 as an output member of the starting clutch C1 and to a clutch outer member 7 as an input member of the speed change clutch C2. These elements are arranged close to one another so that the speed change clutch C2 may be interposed between the starting clutch C1 and the reduction gear train G. With such an arrangement, the transmission device M can be made compact.

As shown in FIG. 1, the starting clutch C1 is partly immersed into lubricating oil stored at the bottom of the crank casing 1, whereas the speed change clutch C2 is positioned as a whole above the surface of lubricating oil. In order to obtain such an arrangement as described, it is preferred that the speed change input shaft 3 be positioned at the same level as or higher than the crank shaft 2.

Next, various parts of the transmission device M will be described in detail.

First, the starting clutch C, which is of the centrifugal type, has a drive plate 10 as an input member spline-connected to the crank shaft 2, a plurality of clutch shoes 12 connected to the other peripheral portion of the drive plate 10 through an oscillating link 11 for radial expanding movement, a return spring 13 in the form of an annular coil for biasing the shoes in a contractive direction, and the clutch drum 6 surrounding the clutch shoes 12. A pair of side plates 14 and 15 are disposed adjacent to both sides of the clutch shoes 12 to resiliently hold the clutch shoes 12 by the force of a belleville spring 16, thereby controlling rolling and vibration thereof, while preventing the return spring 13 from being disengaged from the clutch shoes 12.

When the rotational speed of the crank shaft 2 is lower than a predetermined value, the contracting force of the return spring 13 overcomes the centrifugal force of the clutch shoes 12 which rotate along with the drive plate 10, whereby the clutch shoes 12 are maintained in a contracted state and apart from the inner peripheral surface of the clutch drum 6 (the clutch being released). Thus, the crank shaft 2 runs idle, and the turning torque is not transmitted toward the clutch drum 6.

When the rotational speed of the crank shaft 2 is higher than a predetermined value, the centrifugal force of the clutch shoes 12 overcomes the contracting force of the return spring 13 whereby the clutch shoes 12 start their expansive operation to come into contact with the inner peripheral surface of the clutch drum 6. Since the contact pressure between the shoes and the drum increases as the rotational speed of the crank shaft 2 increases, the operating mode of clutch is changed from the half-set state, wherein the clutch shoes 12 suitably skid along the inner peripheral surface of the clutch drum 6, to the set state wherein the shoes come into frictional contact therewith. Thus, the turning torque of the crank shaft 2 is transmitted from the starting clutch C1 to the reduction gear train G in accordance with the rotational speed of the crank shaft 2, and is transmitted therefrom to the speed change input shaft 3 through the speed change clutch C2, and from there it is transmitted to the drive wheels through a speed change gear not shown, to effect smooth starting of the vehicle.

A one-way clutch C3 disposed between the clutch drum 6 and the crank shaft 2 is of the conventional type, and has a clutch inner member 17 spline-connected to the crank shaft 2, a clutch outer member 18 fixedly mounted on the clutch drum 6, and rollers (or sprag) 19 for transmitting only the rotation from the clutch outer member 18 to the clutch inner member 17. Only when the inverse load is exerted on the clutch drum 6, do the clutch outer and inner members 18, 17 become connected through the rollers 19, thereby transmitting the inverse load to the crank shaft 2. Thus, even if the starting clutch C1 is released, the engine braking action may be obtained.

A series of oil paths 20 are formed between the crank shaft 2 and the end wall of the crank casing 1 which supports the end of the crank shaft. The oil path 20 is divided by a partitioning plug 23 into an upstream oil path 20a and a downstream oil path 20b so that a centrifugal separating chamber 22a, which is defined in a filter cap 22 secured by means of a bolt 21 to one side of the drive plate 10, is positioned midway of the oil path 20. The upstream oil path 20a is in communication with an inlet hole 24 of the separating chamber 22a, whereas the downstream oil path 20b is in communication with an outlet hole 25 thereof. A lubricating pump 26 for pumping up lubricating oil stored within the crank casing 1, is connected to the upstream oil path 20a. Small oil paths 27, 28 and 29 are branched from the downstream oil path 20b.

During the running of the engine, the lubricating oil discharged from the lubricating oil pump 26, flows through the upstream oil path 20a into the centrifugal separating chamber 22a. Here, the turning force is received by the lubricating oil from the filter cap 22 to centrifugally separate chips and other foreign elements f. After that the oil is transferred to the downstream oil path 20b, branched into the small oil paths 27, 28 and 29, and fed into the one-way clutch C3, the starting clutch C1, the bearing of the small-diameter gear 8, the crank pin, etc.

Secondly, the speed change clutch C2, which is of the multiple-plate type, has a clutch inner member 30 as an output member spline-connected to the speed change input shaft 3, with the clutch outer member 7 surrounding the clutch inner 30; a plurality of drive frictional plates 31 in slidable spline engagement with the inner peripheral surface of the clutch outer member 7; and a plurality of driven frictional plates 32 superposed alternately therewith and in slidable spline engagement with the outer peripheral surface of the clutch inner member 30. A pressure receiving plate 33 integral with the clutch inner member 30 is adjacent to one side of these frictional plates 31 and 32, whereas an axially retractable pressure plate 34 is adjacent to the other side thereof. The pressure plate 34 is biased toward the pressure receiving plate 33 by means of a clutch spring 35. The pressure plate 34 is provided with a release member 36 slidably supported in the speed change input shaft 3. The release member 36 has a clutch lever 37 operatively connected thereto.

Normally, therefore, the pressure receiving plate 33 and pressure plate 34 cooperate by the force of the clutch spring 35 to hold under pressure the group of frictional plates 31, 32 for providing a frictional connection therebetween, that is, the speed change clutch C2 is maintained in its set state.

When the clutch lever 37 is operated to withdraw the pressure plate 34 against the force of the clutch spring 35 through the release member 36, the frictional plates 31, 32 are separated, so that the clutch C2 is released. At that time, the speed change gear is switched.

Next, a clutch operating device of the present invention for controlling setting and unsetting of the speed change clutch C2 will be described with reference to FIG. 2. An operating shaft 40 has a pedal 41 fastened to an outer end extending outside the crank casing 1. An operating lever 42 is fastened thereto within the crank casing 1, and a cam mechanism 43 is actuated by the operating lever 42.

The cam mechanism 43 has a rotative cam plate 44 connected to the operating shaft 40 through the operating lever 42; a sliding cam plate 45 rotatably and slidably disposed on the operating shaft 40 in opposed relation to the rotative cam plate 44; and a thrust ball 48 inserted between concave portions 46 and 47 of dishlike cross section each formed in opposite surfaces of the cam plates 44 and 45, respectively. The sliding cam plate 45 is slidably moved along the operating shaft 40 while engaging a guide pin 49 which is secured to the crank casing 1 and extends therefrom in parallel relation to the operating shaft 40. Reference numeral 50 denotes a retainer for the thrust ball 48.

The sliding cam plate 45 is operatively connected to the release member 36 through the clutch lever 37. The clutch lever 37 has its midportion pivoted at 53 to a support member 52 mounted on the crank casing 1 through an adjusting screw 51. The clutch lever has, at its lower end, a return spring 54 connected thereto which is urged backwards (leftwards in FIG. 2) along with the sliding cam plate 45. A small clearance g is formed between the upper end of the clutch lever 37 and the release member 36 in order that when the sliding cam plate 45 is held at its backward position by the force of the return spring 54, the speed change clutch C2 may be positively set. The clearance g is adjusted by forward and backward movement of the support member 52 relative to the crank casing 1 by turning the adjusting screw 51.

The operating shaft 40 has, furthermore, a well known speed change device 56 connected thereto through an interlocking mechanism 55.

Thus, when the pedal 41 is operated to rotate the operating shaft 40 forwardly or in reverse, the rotatable cam 44 is rotated through the operating lever 42 to urge the thrust ball 48 at the inclined surface of the concave portion 46. As a result, the sliding cam plate 45 moves forward to urge the lower end of the clutch lever 37 against the force of the return spring 54 to rotate the clutch lever 37 counterclockwise. As a result, the upper end of the clutch lever 37 comes into contact with the release member 36 to advance the latter and unset the speed change clutch C2 thereby stopping power transmission between the crank shaft 2 and the speed change input shaft 3. Thereafter, the rotation of the operating shaft 40 is transmitted to the speed change device 56 through the interlocking mechanism 55, so that when the operating shaft 40 is rotated forwardly, the speed change device 56 is operated to increase speed while when the operating shaft 40 is rotated in reverse, the speed change device 56 is operated to reduce the speed.

Thereafter, when the operating force to the pedal 41 is released, the clutch lever 37 is rotated clockwise by means of the return spring 54 to urge the sliding cam plate 45 backward, whereby the rotatable cam plate 44 is rotated backward by the force of the thrust ball 48 exerted on the inclined surface of the concave portion 46. As a result, the operating lever 42, the operating shaft 40 and the pedal 41, are all returned to their original position and the speed change clutch C2 again assumes its set state.

As described above, in the present invention, since the return spring 54 acts to bias, the cam mechanism or sliding cam plate 45 backward through the clutch lever 37 which operatively connects the sliding cam plate 45 and the clutch release member 36, the clutch lever 37 is prevented by the return spring 54 from vibrating, despite the fact that the small clearance g is provided between the clutch release member 36 and the clutch lever 37 when the operating shaft 40 is not operated. No noise and no beating wear are consequently produced. In addition, the rotatable cam plate 44 can be positively maintained at a rotational neutral position by the force from the sliding cam plate 45 caused by the action of the return spring 54.

Furthermore, where the clutch operating device of the present invention is applied to the two wheeled vehicle, the operating shaft 40 may also serve as the operating means of the speed change device 56. Thus, in the event that the speed change device 56 is operated by rotation of the operating shaft 40, the clutch C2 is simultaneously and automatically placed in its unset state by rotation of the operating shaft 40 to cut off power transmission from the crank shaft 2 to the speed change input shaft 3. With this arrangement, it is possible to effect the speed change operation in an extremely simple and positive manner only by the rotational operation of the operating shaft 40, and to simplify the structure itself.

Many modifications and variations of the present invention are possible in light of the above teachings. It is, therefore, to be understood that within the scope of the appended claims, the invention may be practiced otherwise than as particularly described.

What is claimed is:

1. A clutch operating device comprising: an operating shaft, cam means disposed on said operating shaft and movable axially as said operating shaft rotates reciprocatingly; a clutch release member for controlling setting and unsetting of a clutch; a clutch lever for operatively connecting said cam means to said clutch release member to actuate the clutch release member in response to axial forward movement of said cam means; and a return spring for biasing said cam means backward through said clutch lever.

2. A clutch operating device according to claim 1, wherein said cam means comprises: a rotatable cam plate disposed on said operating shaft for rotation therewith; and a sliding cam plate facing said rotatable cam plate and axially slidably disposed on said operating shaft, said sliding cam plate being axially movable along said operating shaft by rotation of said rotatable cam plate resulting from rotation of said operating shaft.

3. A clutch operating device according to claim 2, wherein said rotatable cam plate and sliding cam plate have their opposite internal surfaces formed with concave portions of dish-like cross section to receive a thrust ball therein, said sliding cam plate being moved forward axially of the operating shaft through the thrust ball by rotating said rotatable cam plate with respect to the sliding cam plate as said operating shaft rotates.

4. A clutch operating device according to claim 2, including an operating lever fastened to said operating shaft, said rotatable cam plate being rotatably mounted on said operating shaft and being engaged with said operating lever fastened to said operating shaft for prevention of relative rotation thereof with respect to said operating shaft.

5. A clutch operating device according to claim 1, wherein said clutch lever is axially slidably supported on said operating shaft.

6. A clutch operating device according to claim 2, wherein said clutch lever has its mid portion pivotally supported on a casing, said clutch lever having one end placed in engagement with said sliding cam plate and connected to said return spring, said clutch lever having the other end facing said clutch release member with a clearance formed therebetween.

7. A clutch operating device according to claim 6, wherein said clutch lever is pivotally supported on said casing by a support member mounted on said casing through an adjusting screw for adjusting the clearance between said other end of said clutch lever and said clutch release member.

8. A clutch operating device as defined in claim 1, wherein said cam means comprises: a rotatable cam plate disposed on said operating shaft for rotation therewith; and a sliding cam plate facing said rotatable cam plate and axially slidably disposed on said operating shaft, said sliding cam plate being axially movable along said operating shaft by rotation of said rotatable cam plate resulting from rotation of said operating shaft; said rotatable cam plate and sliding cam plate having their opposite internal surfaces formed with concave portions of dish-like cross section to receive a thrust ball therein, said sliding cam plate being moved forward axially of the operating shaft through the thrust ball by rotating said rotatable cam plate with respect to the sliding cam plate as said operating shaft rotates; an operating lever fastened to said operating shaft, said rotatable cam plate being rotatably mounted on said operating shaft and being engaged with said operating lever fastened to said operating shaft for prevention of relative rotation thereof with respect to said operating shaft.

9. A clutch operating device as defined in claim 1, wherein said cam means comprises: a rotatable cam plate disposed on said operating shaft for rotation therewith; and a sliding cam plate facing said rotatable cam plate and axially slidably disposed on said operating shaft, said sliding cam plate being axially movable along said operating shaft by rotation of said rotatable cam plate resulting from rotation of said operating shaft; said clutch lever being axially slidably supported on said operating shaft; said clutch lever having its mid-portion pivotally supported on a casing, said clutch lever having one end placed in engagement with said sliding cam plate and connected to said return spring, said clutch lever having the other end facing said clutch release member with a clearance formed therebetween.

10. In a power transmission system in a two wheeled vehicle comprising: a crank casing; an engine crank shaft rotatably supported on said crank casing; a speed change input shaft rotatably supported on said crank casing in parallel relation to said crank shaft and being connected to a driven member through a speed change device; power transmission means for effecting power transmission between said crank shaft and said speed change input shaft; a clutch for controlling said power transmission means; clutch operating means for activating said clutch, said clutch operating means comprising an operating shaft, cam means disposed on said operating shaft, said cam means being movable axially as said operating shaft rotates reciprocatingly; a clutch release member for controlling setting and unsetting of said clutch; a clutch lever operatively connected between said cam means and said clutch release member for activating said clutch release member in response to axial forward movement of said cam means; and a return spring for biasing said cam means backward through said clutch lever, and means for interlocking said operating shaft and said speed change device whereby said clutch is placed in a cut-off state by reciprocating rotation of said operating shaft to cut off power transmission from said crank shaft to said speed change input shaft while activating simultaneously said speed change device.

* * * * *